United States Patent
Sarwer et al.

(10) Patent No.: US 11,265,544 B2
(45) Date of Patent: Mar. 1, 2022

(54) APPARATUS AND METHOD FOR IMAGE COMPRESSION BASED ON OPTIMAL SEQUENTIAL ENCODING SCHEME

(71) Applicant: SONY CORPORATION, Tokyo (JP)

(72) Inventors: Mohammed Golam Sarwer, San Jose, CA (US); Hye-Yeon Cheong, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 16/134,156

(22) Filed: Sep. 18, 2018

(65) Prior Publication Data

US 2020/0092554 A1   Mar. 19, 2020

(51) Int. Cl.
| | |
|---|---|
| *H04N 19/12* | (2014.01) |
| *H04N 19/625* | (2014.01) |
| *H04N 19/91* | (2014.01) |
| *H04N 19/176* | (2014.01) |
| *H04N 19/124* | (2014.01) |

(52) U.S. Cl.
CPC ........... *H04N 19/12* (2014.11); *H04N 19/124* (2014.11); *H04N 19/176* (2014.11); *H04N 19/625* (2014.11); *H04N 19/91* (2014.11)

(58) Field of Classification Search
CPC ..... H04N 19/12; H04N 19/124; H04N 19/176
See application file for complete search history.

(56) References Cited

U.S. PATENT DOCUMENTS

| | | | |
|---|---|---|---|
| 5,416,604 A * | 5/1995 | Park | H04N 19/176 375/240.01 |
| 8,922,671 B2 | 12/2014 | Gharavi-Alkhansari et al. | |
| 9,161,040 B2 * | 10/2015 | Cheong | H04N 19/176 |
| 2008/0043831 A1* | 2/2008 | Sethuraman | H04N 19/40 375/240 |
| 2010/0074333 A1* | 3/2010 | Au | H04N 19/51 375/240.12 |
| 2010/0296580 A1* | 11/2010 | Metoevi | H04N 19/107 375/240.16 |
| 2011/0292247 A1* | 12/2011 | Gharavi-Alkhansari | H04N 19/176 348/231.99 |

(Continued)

FOREIGN PATENT DOCUMENTS

WO   2015/015436 A2   2/2015

*Primary Examiner* — Jeremiah C Hallenbeck-Huber
(74) *Attorney, Agent, or Firm* — Chip Law Group

(57) ABSTRACT

An image-processing apparatus to compress digital image data, includes a memory that stores a digital image in a first storage space. The image-processing apparatus further includes one or more image-processing circuits that selects a block from a plurality of blocks of the digital image. A plurality of encoded blocks is generated by application of a plurality of sequential encoding schemes on the selected block. One encoded block is detected from the generated plurality of encoded blocks that has a maximum bit-coverage value. A sequential encoding scheme is selected from the plurality of sequential encoding schemes as an optimal sequential encoding scheme. The selected sequential encoding scheme is associated with the detected encoded block with the maximum bit-coverage value. The selected block of the digital image is converted to a compressed bit stream storable in a reduced second storage space in the memory, by use of the sequential encoding scheme.

14 Claims, 5 Drawing Sheets

(56) References Cited

U.S. PATENT DOCUMENTS

| | | | |
|---|---|---|---|
| 2012/0212609 A1* | 8/2012 | Willis | H04N 5/23203 |
| | | | 348/143 |
| 2014/0050262 A1* | 2/2014 | Sakurai | H04N 19/176 |
| | | | 375/240.03 |
| 2014/0169465 A1* | 6/2014 | Yokoyama | H04N 19/176 |
| | | | 375/240.12 |
| 2014/0219342 A1 | 8/2014 | Yu et al. | |
| 2015/0201191 A1* | 7/2015 | Cheong | H04N 19/176 |
| | | | 382/166 |
| 2016/0065985 A1 | 3/2016 | Nakaishi | |
| 2016/0241852 A1* | 8/2016 | Gamei | H04N 19/503 |
| 2018/0324427 A1* | 11/2018 | Cheong | H04N 19/124 |

* cited by examiner

APPARATUS AND METHOD FOR IMAGE COMPRESSION BASED ON OPTIMAL SEQUENTIAL ENCODING SCHEME

CROSS-REFERENCE TO RELATED APPLICATIONS/INCORPORATION BY REFERENCE

None.

FIELD

Various embodiments of the disclosure relate to image compression. More specifically, various embodiments of the disclosure relate to an apparatus and method to compress digital image data based on an optimal sequential encoding scheme determination.

BACKGROUND

Recent advancements in the field of image compression have led to the development of various image codecs to encode and decode digital data, such as images and/or videos. Typically, an encoder in a device, such as a camera, may compress a raw image captured by a communicatively coupled image-capturing device. The encoder may utilize various lossless or lossy image compression techniques, such as transform coding and/or entropy encoding, to encode the captured raw image. In transform coding, pixel data from an image block is transformed to frequency domain represented by transform coefficients. The remaining information, such as the transform coefficients, may then be compressed by use of a variety of methods. The generated bit stream may be transmitted to a decoder which may decompress the received bit stream to reproduce the captured image. In view of the increased popularity of high definition image or video, it is increasingly critical to develop advanced image compression techniques that may make possible high compression and still exemplify low hardware complexity. Therefore, a low latency and low complexity system and method may be desired to efficiently compress digital data with visually lossless results.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method to compress digital image data is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
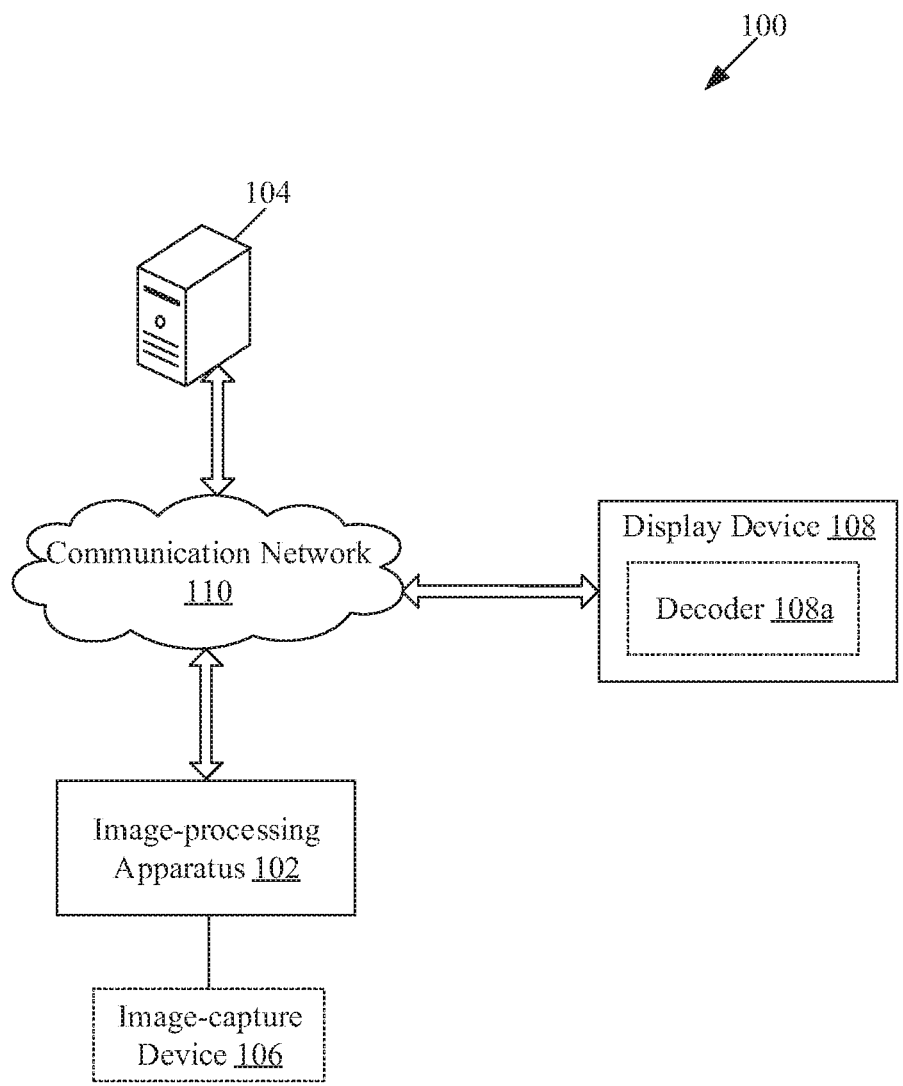
FIG. 1 is a block diagram that illustrates a network environment for compression of digital image data, in accordance with an embodiment of the disclosure.

Various implementations may be found in a system and/or a method to compress digital image data. Exemplary aspects of the disclosure may comprise an apparatus that may comprise a memory and one or more image-processing circuits. The apparatus may be configured to store a digital image in a first storage space of the memory. The apparatus may be configured to partition the digital image into a plurality of blocks. The apparatus may be further configured to select a block from a plurality of blocks of the digital image. The apparatus may be configured to generate a plurality of encoded blocks by application of a plurality of sequential encoding schemes on the selected block. The apparatus may be configured to compute a bit-coverage value for each of the generated plurality of encoded blocks, based on a quantization parameter associated with each of the plurality of encoded blocks. Thus, each of the plurality of encoded blocks may be associated with one sequential encoding scheme of the plurality of sequential encoding schemes and a bit-coverage value. The apparatus may be further configured to detect one encoded block in the generated plurality of encoded blocks that has a maximum bit-coverage value among the plurality of encoded blocks. The apparatus may be configured to select a sequential encoding scheme from the plurality of sequential encoding schemes. The selected sequential encoding scheme may be associated with the detected encoded block with the maximum bit-coverage value. Further, the selected sequential encoding scheme may correspond to an optimal sequential encoding scheme. The apparatus may be configured to convert the digital image to a compressed bit stream storable in a reduced second storage space in the memory, by use of the selected sequential encoding scheme.

In accordance with an embodiment, a first sequential encoding scheme of the plurality of sequential encoding schemes applied to the selected block, may comprise a sequential application of a one-dimensional (1D) row discrete cosine transform (DCT) followed by quantization, a direct current (DC)-only discrete pulse code modulation (DPCM), and entropy coding. A second sequential encoding scheme of the plurality of sequential encoding schemes applied to the selected block, may comprise a sequential application of a 1D row DCT followed by quantization, an all-frequency DPCM, and entropy coding. A third sequential encoding scheme of the plurality of sequential encoding schemes applied to the selected block, may comprise a sequential application of a 1D column DCT followed by quantization, a DC-only DPCM, and entropy coding. A fourth sequential encoding scheme of the plurality of sequential encoding schemes applied to the selected block, may comprise a sequential application of a 1D column DCT followed by quantization, an all-frequency DPCM, and entropy coding.

In accordance with an embodiment, each of the plurality of sequential encoding schemes may comprise selection of a quantization parameter from a plurality of defined quantization parameters for generation of the plurality of encoded blocks. In accordance with an embodiment, the selection of the optimal sequential encoding scheme, based on bit-coverage value associated with each of the plurality of encoded blocks, may be independent of an execution of an inverse quantization and an inverse transform on the plurality of encoded blocks. In accordance with an embodiment, the selection of the optimal sequential encoding scheme along with the conversion of each block of the plurality of blocks of the digital image may be performed independently for each block of the plurality of blocks of the digital image.

FIG. 1 is a block diagram that illustrates a network environment for compression of digital image data, in accordance with an embodiment of the disclosure. With reference to FIG. 1, there is shown a network environment 100. The network environment 100 may include an image-processing apparatus 102, a server 104, an image-capture device 106, a display device 108, and a communication network 110. The display device 108 may further comprise a decoder 108a. The image-processing apparatus 102 may be associated with the image-capture device 106. The image-processing apparatus 102, the server 104, and the display device 108 may be communicatively coupled to each other, via the communication network 110.

The image-processing apparatus 102 may comprise suitable logic, circuitry, interfaces, and/or code that may be configured to process one or more digital images and/or videos. The image-processing apparatus 102 may be configured to compress each of the one or more digital images and/or videos to generate a compressed bit stream. The image-processing apparatus 102 may transmit the compressed bit stream to the display device 108 for display. Examples of the image-processing apparatus 102 may include, but are not limited to, an endoscopic device, personal computer, a laptop computer, a computer workstation, a mainframe computer, a handheld computer, a cellular/mobile phone, a smart appliance, a gaming console, a digital camera, a digital camcorder, a camera phone, a video player, a DVD writer/player, a television, and/or other computing device.

The server 104 may comprise suitable circuitry, interfaces, and/or code that may be configured to store the one or more digital images and/or videos in compressed or uncompressed form. Examples of the server 104 may include, but are not limited to, an application server, a cloud server, a web server, a database server, a file server, a gaming server, a mainframe server, or a combination thereof.

The image-capture device 106 may comprise suitable logic, circuitry, interfaces, and/or code that may be configured to capture the one or more digital images and/or videos. Further, the image-capture device 106 may be configured to transmit the captured one or more digital images and/or videos, such as a color image, as input to the image-processing apparatus 102 for processing. The image-capture device 106 may include a lens assembly and an image sensor that may enable the image-capture device 106 to capture the one or more digital images and/or videos. The image sensor of the image-capture device 106 may be implemented by use of a charge-coupled device (CCD) technology or complementary metal-oxide-semiconductor (CMOS) technology. Examples of the image-capture device 106 may include, but are not limited to, at least a camera, a camcorder, and/or an action camera. The image-capture device 106 may be implemented as an integrated unit of the image-processing apparatus 102, or a separate device.

The display device 108 may comprise suitable logic, circuitry, interfaces, and/or code that may be configured to receive the compressed bit stream from the image-processing apparatus 102. The display device 108 may further include the decoder 108a, which may be configured to decode the compressed bit stream (received from the image-processing apparatus 102) of the compressed one or more digital images to display the one or more digital images. The display device 108 may be configured to render the decoded digital content, such as the one or more digital images and/or videos. Examples of the display device 108 may include, but are not limited to, a laptop, a tablet computer, a smartphone, a display screen, and/or other display devices.

The decoder 108a may comprise suitable logic, circuitry, interfaces, and/or code that may be configured to decode the compressed bit stream received from the image-processing apparatus 102. Further, the decoder 108a may be configured to generate the one or more digital images and/or videos based on the decoding of the compressed bit stream. A person ordinary skilled in the art will understand that the decoder 108a may be implemented in the image-processing apparatus 102, without deviation from the scope of the disclosure.

The communication network 110 may include a medium through which the image-processing apparatus 102 may communicate with the server 104. Examples of the communication network 110 may include, but are not limited to, the Internet, a cloud network, a Long Term Evolution (LTE) network, a Wireless Local Area Network (WLAN), a Local Area Network (LAN), a telephone line (POTS), and/or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the image-processing apparatus 102 may be configured to receive one or more digital images from the server 104 or another external device (not shown). Alternatively, the one or more digital images may be obtained from the image-capture device 106 integrated with the image-processing apparatus 102. The image-processing apparatus 102 may be configured to partition a digital image in the received one or more digital images into a plurality of blocks. Each block of the plurality of blocks may comprise a plurality of pixels. The size of the block may be based on a pre-determined value, such as "8×8 pixels". Each pixel in the block may be further represented by one or more bits, such as a combination of eight bits. Thus, each block may comprise a plurality of bits.

In accordance with an embodiment, the image-processing apparatus 102 may be configured to select one block from the plurality of blocks of the received digital image. After the selection of the one block, the image-processing apparatus 102 may be configured to apply a plurality of sequential encoding schemes to the selected block. The application of the plurality of sequential encoding schemes on the selected block may generate a plurality of encoded blocks. One encoded block in the plurality of encoded blocks is associated with one sequential encoding scheme in the plurality of sequential encoding schemes.

The application of each of the plurality of sequential encoding schemes may include transform coding of the selected block of the plurality of blocks. Thus, the image-processing apparatus 102 may be configured to perform transform coding on the selected block. For example, for a first sequential encoding scheme, the image-processing apparatus 102 may perform the transform coding of the selected block by use of one-dimensional (1D) row discrete cosine transform (DCT). Similarly, for a second sequential encoding scheme, the image-processing apparatus 102 may perform the transform coding of the selected block by use of 1D column DCT. The 1D row DCT or 1D column DCT may be less complex as compared to the 2D DCT. The 1D row DCT transform or 1-D column DCT transform may be one of the possible modes of transform coding. Therefore, in some embodiments, instead of 1D row DCT or 1D column DCT, the image-processing apparatus 102 may apply one of 2D DCT, 1D discrete sine transform row (DST), 1D column DST, 2D DST, single- or multi-dimensional DCT Type I, II, IV, V, VI, VII, VIII, and the like. In other embodiments, instead of computing transform coefficients in transform domain, the image-processing apparatus 102 may be configured to apply, on the selected block, a possible mode that utilizes sample-domain (i.e., time-domain) techniques.

By application of the transform coding, the selected block may be transformed into frequency domain represented by a plurality of transform coefficients. For example, the transform coding in the first sequential encoding scheme may transform the selected block into a first plurality of transform coefficients. Similarly, the transform coding in the second sequential encoding scheme may transform the selected block into a second plurality of transform coefficients.

Each of the plurality sequential encoding schemes may further include a quantization of the corresponding transform block. The image-processing apparatus 102 may be configured to quantize the transform block corresponding to each of the plurality sequential encoding schemes. The image-processing apparatus 102 may utilize a plurality of defined quantization parameters for the quantization of the transform block corresponding to each of the plurality sequential encoding schemes. In accordance with an embodiment, the image-processing apparatus 102 may be configured to select an optimum quantization parameter from the plurality of defined quantization parameters, based on a quality parameter to be achieved in the compressed digital image. The image-processing apparatus 102 may be configured to determine a first number of bits from a defined number of bits, which represent a transform coefficient. For example, a transform coefficient in a plurality of transform coefficients may be represented by 8 bits (such as the defined number of bits). The image-processing apparatus 102 may determine 4 most significant bits (such as the first four number of bits) from the 8 bits. In accordance with an embodiment, the image-processing apparatus 102 may be configured to perform zero padding after the determined first number of bits, such as after the 4 most significant bits, of the defined number of bits. The image-processing apparatus 102 may determine the first number of bits for each of the plurality of transform coefficients in each of the plurality of transform blocks. The image-processing apparatus 102 may then quantize the determined first number of bits for each of the plurality of transform coefficients, based on the selected optimum quantization parameter. The quantized first number of bits of the plurality of transform coefficients may correspond to a plurality of quantized bits. After quantization, the plurality of transform blocks may be referred to as a plurality of quantized transform blocks and the plurality of transform coefficients as a plurality of quantized transform coefficients. Notwithstanding, the disclosure may not be so limited, and the optimum quantization parameter may correspond to a parameter provided by a user (not shown), without departure from the scope of the disclosure.

Each of the plurality of sequential encoding schemes may further include a DPCM of the plurality of quantized bits associated with the corresponding quantized transform block in the plurality of quantized transform blocks. The image-processing apparatus 102 may be configured to compute the DPCM of the plurality of quantized bits associated with a quantized transform block in the plurality of quantized transform blocks. Based on the computation of the DPCM, the image-processing apparatus 102 may be configured to determine a residual for each quantized coefficient in the plurality of quantized transform coefficients associated with each of the plurality of sequential encoding schemes. The determined residual may represent a difference between two quantized transform coefficients. Thus, the image-processing apparatus 102 may determine a plurality of residuals for each of the plurality of quantized transform blocks. In accordance with an embodiment, a type of DPCM used in the plurality of sequential encoding schemes may be different. For example, in a first sequential encoding scheme, the image-processing apparatus 102 may compute the DPCM for the plurality of quantized transform coefficients by use of a direct current (DC) only DPCM. Further, in a second sequential encoding scheme, the image-processing apparatus 102 may compute the DPCM for the plurality of quantized transform coefficients by use of an all-frequency DPCM. In accordance with an embodiment, the image-processing apparatus 102 may be configured to select an optimum DPCM type, based on the quality parameter to be achieved in the compressed digital image.

Each of the plurality of sequential encoding schemes may further include an entropy coding of the plurality of residuals associated with the corresponding quantized transform block in the plurality of quantized transform blocks. The image-processing apparatus 102 may be configured to perform the entropy coding of the plurality of residuals associated with the corresponding quantized transform block in the plurality of quantized transform blocks. Examples of the entropy coding techniques of the plurality of residuals may include, but are not limited to, unary coding, and/or Huffman coding. After the application of the entropy coding on each of the plurality of residuals associated with the corresponding quantized transform block, the plurality of quantized transform blocks may be referred to as the plurality of encoded blocks.

After generation of the plurality of encoded blocks by application of the plurality of sequential encoding schemes, the image-processing apparatus 102 may be configured to compute a bit-coverage value for each of the plurality of encoded blocks. The bit-coverage value for an encoded block may represent a count of bits in the selected block that are coded losslessly within the encoded block. The bit-coverage value may represent a measure of quality that may be achieved in the compressed digital image. Thus, a higher bit-coverage value in comparison to a lower bit-coverage value may represent that the compressed digital image associated with the higher bit-coverage value is of better quality within the provided bit-budget.

Although the disclosure describes the selection of an optimum encoding scheme using estimation of a bit coverage value for different possible modes of transform estimation. However, the disclosure may not be so limited and the selection of the optimum encoding scheme may be done based on estimation of minimum total sum of absolute difference (TSAD) from two or more TSAD's estimated after application of inverse quantization and followed by inverse transformation of an encoded block obtained from encoded bit-stream through different applicable modes for the encoding of a block of the input image. The mode (or the transform scheme) through which the TSAD obtained is minimum, may be selected as the best or optimum encoding scheme for the encoding of the block of the input image.

The image-processing apparatus 102 may further compare the bit-coverage value associated with the plurality of encoded blocks. Based on the comparison, the image-processing apparatus 102 may detect the encoded block associated with the maximum bit-coverage value. Further, the image-processing apparatus 102 may be configured to select the sequential encoding scheme associated with the identified encoded block with the maximum bit-coverage value. The selected sequential encoding scheme may refer to an optimum encoding scheme for the compression of the received digital image. Alternatively stated, the image-processing apparatus 102 may determine an optimum sequential encoding scheme from the plurality of sequential encoding schemes based on the detection of the encoded block associated with the maximum bit-coverage value.

After the selection of the sequential encoding scheme, the image-processing apparatus 102 may be configured to convert the selected block of the digital image to a compressed bit stream storable in a reduced second storage space in the memory, by use of the selected sequential encoding scheme. In accordance with an embodiment, the selection of the optimal sequential encoding scheme along with the conversion may be performed independently for each block of the plurality of blocks of the digital image. Alternatively stated, estimation of bit-coverage value, selection of an optimal sequential encoding scheme, and conversion of each selected of the plurality of blocks may be performed independently. Thereafter, the image-processing apparatus 108 may be configured to compress the received digital image to generate a compressed bit stream by use of a selected sequential encoding scheme for each block of the plurality of blocks. The compressed bit stream may represent a compressed digital image. Further, the image-processing apparatus 102 may be configured to store the compressed bit stream as the compressed digital image in a highly reduced storage space of the image-processing apparatus 102 or at the server 104. The storage space required to store the compressed bit stream at the server 104 may be less than that required to store the uncompressed digital image.

In accordance with an embodiment, the image-processing apparatus 102 may be further configured to assign header bits at the start of the compressed bit stream. The header bits may be used to store information, such as the optimum quantization parameter and the selected sequential encoding scheme. In accordance with an embodiment, after generation of the compressed bit stream, the image-processing apparatus 102 may be configured to transmit the generated compressed bit stream to the display device 108, via the communication network 110. The decoder 108a of the display device 108 may be configured to decode and decompress the received compressed bit stream, based on signaling, for example of the selected optimum quantization parameter and the selected optimal sequential encoding scheme, in the header bits of the compressed bit stream.

The decoder 108a may be configured to determine the quantization parameter and the type of sequential encoding scheme applied on the digital image from the header bits of the received compressed bit stream. In accordance with an embodiment, the decoder 108a may be further configured to perform DPCM demodulation, inverse quantization, and inverse transform to render the digital image on the display device 108.

Figure 2:
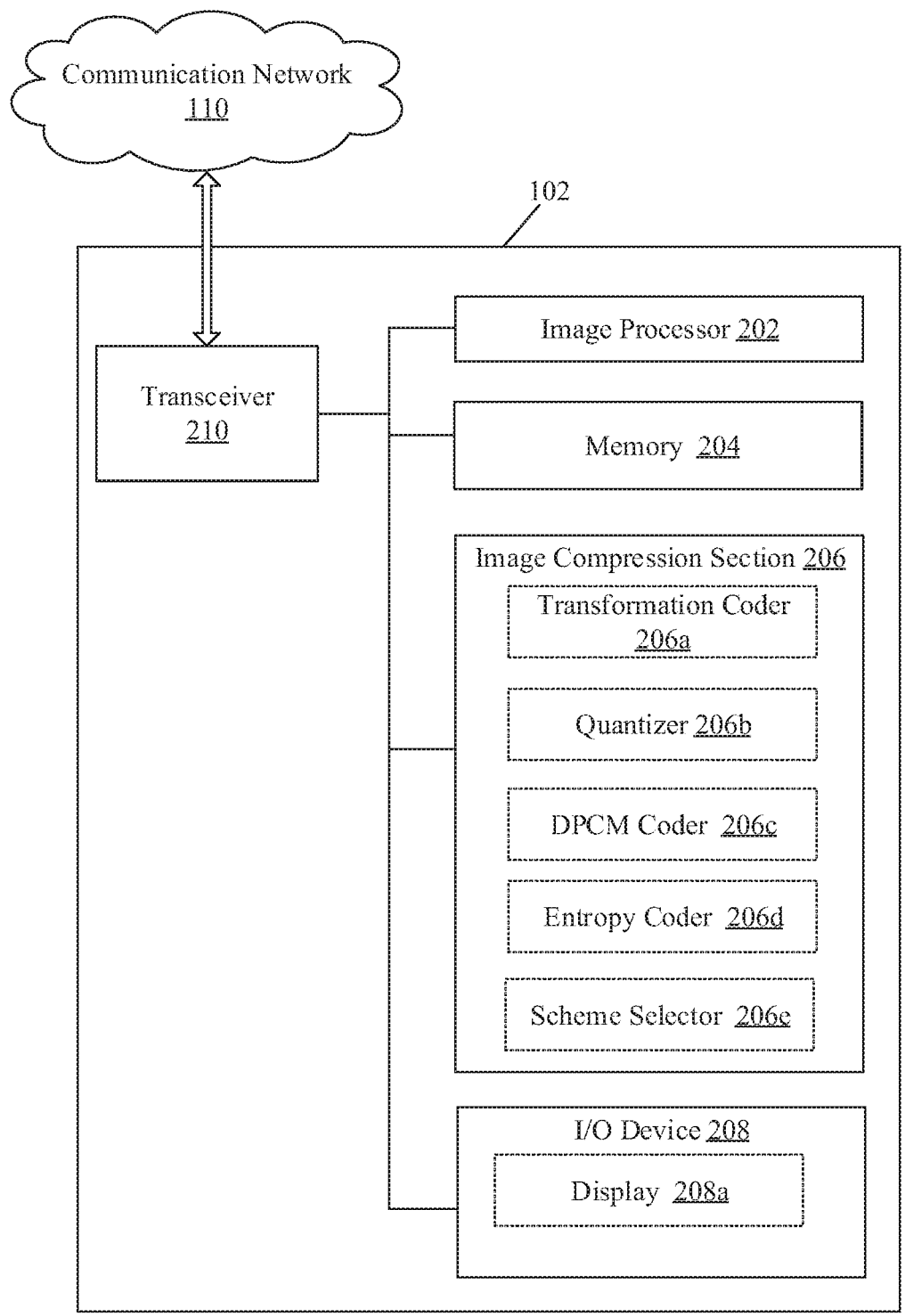
FIG. 2 is a detailed block diagram that illustrates an exemplary image processing apparatus for compression of digital image data, in accordance with an embodiment of the disclosure.

FIG. 2 is a detailed block diagram that illustrates the image-processing apparatus 102 for compression of digital image data, in accordance with an embodiment of the disclosure. FIG. 2 is explained in conjunction with elements from FIG. 1. With reference to FIG. 2, the image-processing apparatus 102 may comprise one or more image-processing circuits, such as an image processor 202, a memory 204, an image compression section 206, an input/output (I/O) device 208, and a transceiver 210. The image compression section 206 may further include a transformation coder 206a, a quantizer 206b, a DPCM coder 206c, an entropy coder 206d, and a scheme selector 206e. The I/O device 208 may further include the image-capture device 106 and a display 208a. The memory 204, the image compression section 206, the I/O device 208, and the transceiver 210 may be communicatively connected to the image processor 202.

The image processor 202 may comprise suitable logic, circuitry, interfaces, and/or code that may be operable to execute a set of instructions stored in the memory 204. The image processor 202 may be configured to instruct the image compression section 206 to compress the one or more digital images and/or videos. The image processor 202 may be further configured to partition a digital image, which is to be compressed, into a plurality of blocks (as described in FIG. 1). Further, the image processor 202 may be configured to select one block from the plurality of blocks as an input for a plurality of sequential encoding schemes. The image processor 202 may be a specialized image processing application processor, implemented based on a number of processor technologies known in the art. Examples of the image processor 202 may be an Application-Specific Integrated Circuit (ASIC) processor, a Complex Instruction Set Computing (CISC) processor, and/or other hardware processors.

The memory 204 may comprise suitable logic, circuitry, and/or interfaces that may be operable to store a set of instructions executable by the image processor 202 and the image compression section 206. The memory 204 may be configured to store the one or more digital images and/or videos in compressed or uncompressed form. Examples of implementation of the memory 204 may include, but are not limited to, Random Access Memory (RAM), Read Only Memory (ROM), Hard Disk Drive (HDD), and/or a Secure Digital (SD) card.

The image compression section 206 may comprise suitable logic, circuitry, interfaces, and/or code that may be configured to compress the one or more digital images and/or videos. The image compression section 206 may include the transformation coder 206a, the quantizer 206b, the DPCM coder 206c, the entropy coder 206d, and the scheme selector 206e.

The transformation coder 206a may comprise suitable logic, circuitry, interfaces, and/or code that may be configured to transform pixel data of a plurality of blocks of a digital image to frequency domain. In accordance with an embodiment, the transformation coder 206a may be configured to transform the pixel data of the selected block of a digital image to frequency domain. The transformed pixel data of the selected block may be represented as transform coefficients The transformation coder 206a may be configured to utilize 1D row DCT or 1D column DCT, for the transformation of the pixel data of the selected block to frequency domain. The 1D row DCT or 1-D column DCT transform may be one of the possible modes of transform. Therefore, in some embodiments, instead of 1D row DCT or 1D column DCT, the transformation coder 206a applies one of 2D DCT, 1D discrete sine transform row (DST), 1D column DST, 2D DST, DCT Type I, II, IV, V, VI, VII, VIII, and the like.

The quantizer 206b may comprise suitable logic, circuitry, interfaces, and/or code that may be configured to quantize each of the plurality of transform blocks of each of the one or more digital images and/or videos. In accordance with an embodiment, the quantizer 206b may be configured to quantize a transform block by use of plurality of defined quantization parameters. The quantizer 206b may select one defined quantization parameter from the plurality of defined quantization parameters to quantize the transform block.

The DPCM coder 206c may comprise suitable logic, circuitry, interfaces, and/or code that may be configured to compute DPCM for each of the plurality of quantized transform blocks to generate a plurality of residuals corresponding to each of the plurality of quantized transform blocks. In accordance with an embodiment, the DPCM coder 206c may utilize one or more known technologies, such as DC-only DPCM or all-frequency DPCM, to compute DPCM for each of the plurality of quantized transform blocks. The DPCM coder 206c may be implemented, for example, on an Application Specific Integrated Circuit (ASIC) or Field Programmable Gate Array (FPGA). In an exemplary implementation, the quantizer 206b may be implemented on the same ASIC as the DPCM coder 206c.

The entropy coder 206d may comprise suitable logic, circuitry, interfaces, and/or code that may be configured to perform entropy coding of the plurality of residuals (obtained based on DPCM for each of the plurality of quantized transform blocks). The entropy coder 206d may be implemented by use of ASIC or FPGA.

The scheme selector 206e may comprise suitable logic, circuitry, interfaces, and/or code that may be configured to select one sequential encoding scheme from the plurality of sequential encoding schemes, based on a bit-coverage value computed for each of the plurality of encoded blocks. For the selection of the one sequential encoding scheme, the scheme selector 206e may be configured to compute the bit-coverage value for each of the encoded plurality of blocks. The scheme selector 206e may compute the bit-coverage value for each of the encoded plurality of blocks, based on the quantization parameter associated with each of the corresponding plurality of quantized transform blocks. Further, the scheme selector 206e may be configured to compare the bit-coverage value of each of the encoded plurality of blocks for the selection of the one optimal sequential encoding scheme from the plurality of sequential encoding schemes. The scheme selector 206e may be implemented by use of, for example, an ASIC or a FPGA.

The I/O device 208 may comprise suitable logic, circuitry, interfaces, and/or code that may be configured to receive the one or more digital images and/or videos to be compressed. The I/O device 208 may comprise various input and output devices that may be configured to communicate with the image processor 202. Examples of the input devices may include, but is not limited to, a touch screen, a keyboard, a mouse, a joystick, a microphone, and/or the image-capture device 106. Examples of the output devices may include, but is not limited to, the display 208a and/or a speaker.

The display 208a may comprise suitable logic, circuitry, interfaces, and/or code that may be configured to display decoded one or more digital images and/or videos. The display 208a may be realized through several known technologies, such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display 208a may refer to various output devices, such as a display screen of smartglass device, a projection-based display, an electro-chromic display, and/or a transparent display.

The transceiver 210 may comprise suitable logic, circuitry, interfaces, and/or code that may be configured to transmit the compressed bit stream to the display device 108, via the communication network 110. The transceiver 210 may implement known technologies to support wired or wireless communication with the communication network 110. The transceiver 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120 g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions and/or operations performed by the image-processing apparatus 102, as described in FIG. 1, may be performed by the image processor 202 and/or the image compression section 206. Other operations performed by the image processor 202 and the image compression section 206, are further described, in FIGS. 3A and 3B.

Figure 3A:
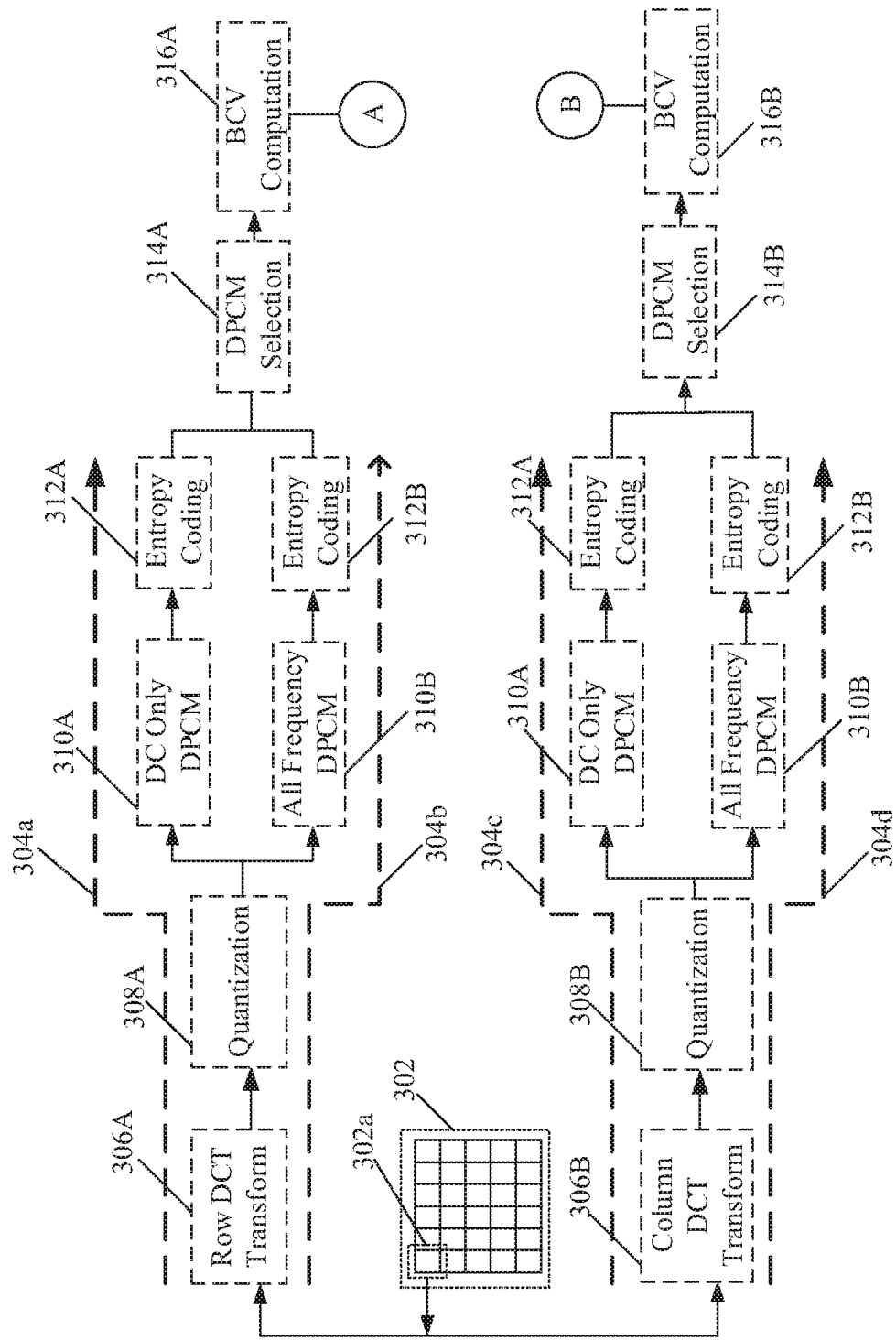
FIGS. 3A and 3B, collectively, illustrate an exemplary scenario for compression of digital image data, in accordance with an embodiment of the disclosure.
Figure 3B:
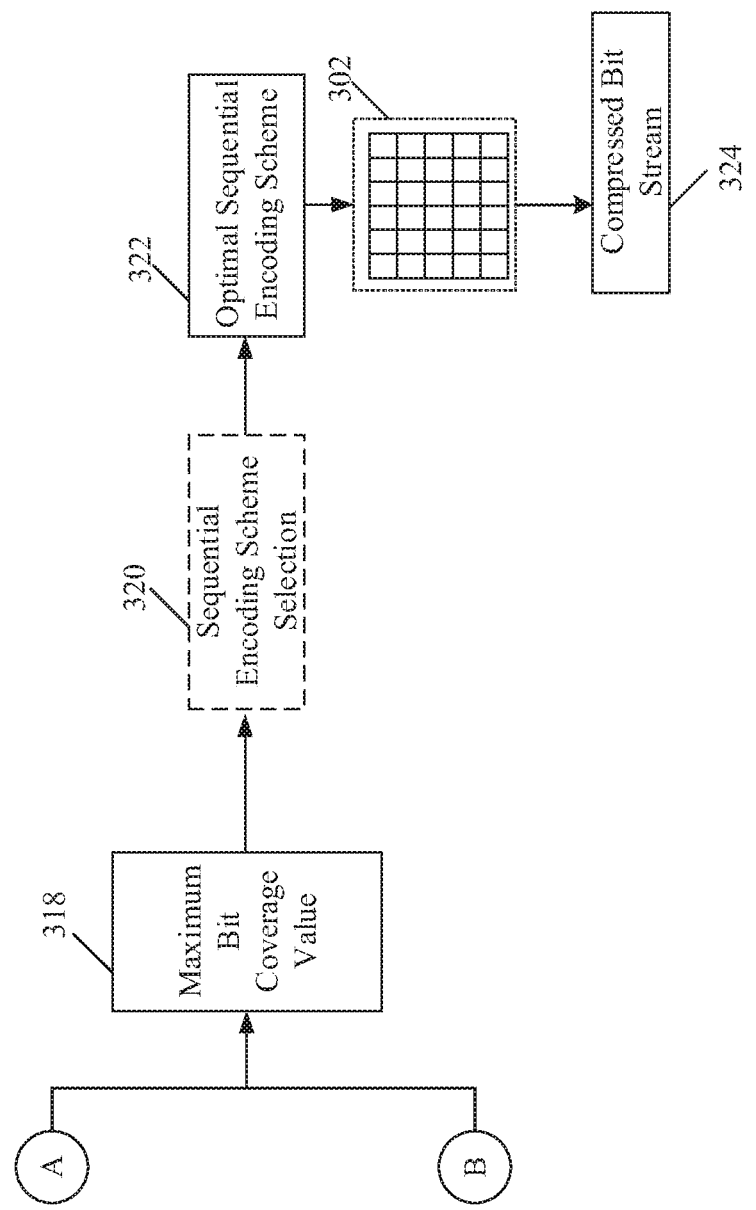

FIGS. 3A and 3B, collectively, illustrate an exemplary scenario for implementation of the disclosed apparatus and method to compress digital image data, in accordance with an embodiment of the disclosure. FIGS. 3A and 3B are explained in conjunction with elements from, for example, FIG. 1 and FIG. 2. With reference to FIG. 3A, there is shown a digital image 302, a block 302a, a first sequential encoding scheme 304a, a second sequential encoding scheme 304b, a third sequential encoding scheme 304c, and a fourth sequential encoding scheme 304d. For the sake of brevity, the ongoing description has been explained with reference to four sequential encoding schemes (such as the first sequential encoding scheme 304a, the second sequential encoding scheme 304b, the third sequential encoding scheme 304c, and the fourth sequential encoding scheme 304d). However, the scope of the disclosure is not limited to the explained four sequential encoding schemes.

In accordance with the exemplary scenario, the image processor 202 may retrieve the digital image 302 from the memory 204 for compression. The digital image 302 may be stored in a first storage space in the memory 204. The digital image 302 may comprise a plurality of pixels. The image processor 202 may retrieve a pre-determined value of a size of a block, from the memory 204, such as, "8×8 pixels" block. The size of the block may be determined in real-time or near-real time. Alternatively, the size of the block may correspond to a value provided in real time or near-real time by a user (not shown).

The image processor 202 may be further configured to partition the digital image 302 into a plurality of blocks, based on the size of the block. In accordance with an embodiment, each of the plurality of blocks may comprise a plurality of pixels in the digital image 302. Further, each of the plurality of pixels in each of the plurality of blocks may be represented as a sequence of bits. Therefore, each of the plurality of blocks may comprise a plurality of bits.

The image processor 202 may be configured to select one block from the plurality of blocks of the digital image 302. For example, the image processor 202 may select the block 302a from the plurality of blocks. The selected block 302a may be a representative block of the digital image 302. Further, each pixel in the block 302a may be represented as the sequence of the bits. The count of bits utilized to represent each pixel in the plurality of pixels in the block 302a may correspond to a first bit depth of the block 302a. For example, if each pixel in the plurality of pixels of the block 302a is represented by eight bits, the first bit depth may be a value "8".

The image processor 202 may further instruct the image compression section 206 to apply the plurality of sequential encoding schemes on the selected block 302a. The image compression section 206 may then generate a plurality of encoded blocks as output of the plurality of sequential encoding schemes. For example, a first encoded block may be an output of the first sequential encoding scheme 304a, a second encoded block may be an output of the second sequential encoding scheme 304b. Further, a third encoded block may be an output of the third sequential encoding scheme 304c and a fourth encoded block may be an output of the fourth sequential encoding scheme 304d.

The first sequential encoding scheme 304a may be applied for the generation of the first encoded block from the block 302a. The first sequential encoding scheme 304a may include sequential application of operation 306A, followed by operations 308A, 310A and 312A, as shown. At operation 306A, for generation of the first encoded block, the image processor 202 may provide the block 302a as an input to the transformation coder 206a in the image compression section 206. The transformation coder 206a may be configured to apply 1D row DCT on the block 302a, to determine a first plurality of transform coefficients for the block 302a. The 1D row DCT transform may be one of the possible modes of transform. Therefore, in some embodiments, instead of 1D row DCT, the transformation coder 206a applies one of 2D DCT, 1D discrete sine transform row (DST), 1D column DST, 2D DST, DCT Type I, II, IV, V, VI, VII, VIII, and the like. In other embodiments, instead of computing transform coefficients in transform domain, the transformation coder 206a may be configured to apply, on the block 302a, a possible mode that utilizes sample-domain (i.e., time-domain) techniques.

For example, if the block 302a is of a size "8×8 pixels", the transformation coder 206a applies the 1D row DCT on each of the "8 rows" of the block 302a. The application of 1D row DCT on each row of the block 302a may generate transform coefficients. The transform coefficients of the block 302a may be collectively referred to as a first plurality of transform coefficients. Further, the first transform coefficient of the block 302a may correspond to a Direct Current (DC) value, which is an integer value. The remaining transform coefficients of the block 302a other than the DC value may correspond to Alternating Current (AC) values. For example, in an 8×8 block, the DC value (at coordinates 0,0 of the 8×8 block) has a non-zero value, followed by 63 Alternating Current (AC) values, with both non-zero or zero values. Each transform coefficient in the first plurality of transform coefficients may be represented by a defined number of bits. The count of the defined number of bits utilized to represent each transform coefficient in the first plurality of transform coefficients of the block 302a, may correspond to a second bit depth. The second bit depth may vary based on a type of forward transform and/or a transform size, applied on a block (e.g., the block 302a). Alternatively stated, the defined number of bits that are utilized to represent each transform coefficient of a block (e.g., the block 302a), may vary in accordance with a type of forward transform and/or a transform size applied on the block. As an example, for 1D row DCT transform or for 1D column transform, the transform size can be "4×1", "8×1", "16×1". For 2D DCT transform, the transform size can be "4×4", "8×8", and "16×16".

For example, if each transform coefficient in the first plurality of transform coefficients is represented by eight bits, the second bit depth may be a value "8". After application of 1D row DCT, the block 302a may be referred to as first transform block. The transformation coder 206a may be further configured to provide the determined first plurality of transform coefficients to the quantizer 206b.

At operation 308A, the quantizer 206b may be configured to quantize the first plurality of transform coefficients to generate a first plurality of quantized transform coefficients. Each quantized transform coefficient may correspond to a quantization level in the one or more quantization levels. In accordance with an embodiment, for generation of the first plurality of quantized transform coefficients, the quantizer 206b may be configured to select one optimum quantization parameter from plurality of defined quantization parameters. Thereafter, the quantizer 206b may be configured to quantize the first plurality of transform coefficients with the selected quantization parameter. After quantization, the first transform block may be referred to as first quantized transform block. For the quantization, the quantizer 206b may determine the first number of bits from the defined number of bits (which represent a transform coefficient). For example, a transform coefficient in a first plurality of transform coefficients may be represented by 8 bits (such as the defined number of bits). The quantizer 206b may determine 4 most significant bits (such as the first four number of bits) from the 8 bits of each of the plurality of transform coefficients. The quantizer 206b may further perform zero padding after on the determined first number of bits, such as after the 4 most significant bits, of the defined number of bits, such as "10110000". Further, the quantizer 206b may be configured to quantize the determined first number of bits based on the selected quantization parameter.

A person with ordinary skill in the art will understand that the scope of the disclosure is not limited to a selection of one quantization parameter, such as an optimum quantization parameter from the plurality of defined quantization parameters. In accordance with an embodiment, the quantizer 206b may be configured to generate the first plurality of quantized transform coefficients corresponding to each of the plurality of defined quantization parameters. Thus, the subsequent operations in the first sequential encoding scheme 304a are applied on the first plurality of quantized transform coefficients corresponding to each of the plurality of defined quantization parameters. The quantizer 206*b* may be further configured to provide the first plurality of quantized transform coefficients to the DPCM coder 206*c*.

At operation 310A, the DPCM coder 206*c* may be configured to apply a DC-only DPCM for the first column that include the DC value of the first quantized transform block. To compute the DC-only DPCM, the DPCM coder 206*c* may be configured to compute a difference between a successive quantized transform of the first column and a previous quantized transform starting from the DC value for the first column. Other columns of the first quantized transform block may not be further coded in the DC-only DPCM. Based on the computed DC-only DPCM, the DPCM coder 206*c* may be configured to determine a residual for each of quantized transform coefficients of the first column except the DC value of the first quantized transform block. Thus, the first quantized transform block may comprise residuals in the first column after the DC-only DPCM operation has been performed by the DPCM coder 206*c*.

At operation 312A, the entropy coder 206*d* may be further configured to apply entropy coding after the application of the DC-only DPCM to generate the first encoded block. The applied entropy coding techniques may include, but are not limited to, unary coding, Huffman coding, Universal coding, Shannon coding, Shannon-Fano coding, and/or Shannon-Fano-Elias coding.

The second sequential encoding scheme 304*b* may be applied for the generation of the second encoded block from the block 302*a*. The second sequential encoding scheme 304*b* may include sequential application of the operation 306A, followed by operations 308A, 310B and 312B, as shown. In the second sequential encoding scheme 304*b*, instead of the DC-only DPCM, the DPCM coder 206*c* may be configured to compute an all-frequency DPCM for each column of the first quantized transform block, at operation 310B. In accordance with an embodiment, based on the computed all-frequency DPCM, the DPCM coder 206*c* may further be configured to determine a residual for each of the first plurality of quantized transform coefficients. Thus, the quantized transform block may comprise residuals after the all-frequency DPCM operation has been performed by the DPCM coder 206*c*. The DPCM coder 206*c* may be further configured to communicate the determined residuals to the entropy coder 206*d*. At 312B, the entropy coder 206*d* may be further configured to apply entropy coding on the residuals to generate the second encoded block.

The third sequential encoding scheme 304*c* may be applied for the generation of the third encoded block from the block 302*a*. The third sequential encoding scheme 304*c* may include sequential application of operation 306B, followed by operations 308B, 310A and 312A, as shown. In the third sequential encoding scheme 304*c*, instead of the 1D row DCT, the transformation coder 206*a* may be configured to apply 1D column DCT on the block 302*a*, to determine a second plurality of transform coefficients for the block 302*a*. The 1D column DCT transform may be one of the possible modes of transform. Therefore, in some embodiments, instead of 1D column DCT, the transformation coder 206*a* applies one of 2D DCT, 1D discrete sine transform row (DST), 1D column DST, 2D DST, DCT Type I, II, IV, V, VI, VII, VIII, and the like. In other embodiments, instead of computing transform coefficients in transform domain, the transformation coder 206*a* may be configured to apply, on the block 302*a*, a possible mode that utilizes sample-domain (i.e., time-domain) techniques.

The transformation coder 206*a* may be further configured to provide the determined second plurality of transform coefficients to the quantizer 206*b*. At operation 308B, the quantizer 206*b* may be configured to quantize the second plurality of transform coefficients to generate a second plurality of quantized transform coefficients. The quantizer 206*b* may be further configured to provide the second plurality of quantized transform coefficients to the DPCM coder 206*c* to perform the operation 310A (DC only DPCM) on the second plurality of quantized transform coefficients for the determination of residuals. The DPCM coder 206*c* may be further configured to communicate the determined residuals to the entropy coder 206*d*. At operation 312A, the entropy coder 206*d* may be further configured to apply entropy coding on the residuals obtained from operation 310A to generate the third encoded block.

The fourth sequential encoding scheme 304*d* may be applied for the generation of the fourth encoded block from the block 302*a*. The fourth sequential encoding scheme 304*d* may include sequential application of operation 306B, followed by operations 308B, 310B and 312B, as shown. In the fourth sequential encoding scheme 304*d*, instead of the DC-only DPCM, the DPCM coder 206*c* may be configured to compute the all-frequency DPCM for each of the second plurality of quantized transform coefficients, at operation 310B. In accordance with an embodiment, based on the computed all-frequency DPCM, the DPCM coder 206*c* may further be configured to determine a residual for each of the second plurality of quantized transform coefficients. Thus, the quantized transform block may comprise residuals after the all-frequency DPCM operation has been performed by the DPCM coder 206*c*. At 312B, the entropy coder 206*d* may be configured to apply entropy coding on the residuals obtained from operation 310B to generate the fourth encoded block.

The entropy coder 206*d* may be further configured to provide the generated plurality of encoded blocks to the scheme selector 206*e*. The plurality of encoded blocks may include the first encoded block, the second encoded block, the third encoded block, and the fourth encoded block. At operations 314A and 314B, the scheme selector 206*e* may be further configured to select one encoded block from the plurality of encoded blocks, which may be transformed based on the same transformation type by the transformation coder 206*a*. The selection of the one encoded block from the plurality of encoded blocks with same transformation type may be based on the DPCM type computed by the DPCM coder 206*c*. For example, the first encoded block and the second encoded block are generated based on a same type of transformation (such as the 1D row DCT) and the third encoded block and the fourth encoded block are generated based on a same type of transformation (such as the 1D column DCT). Thus, the scheme selector 206*e* may select one encoded block from the first encoded block and the second encoded block. The scheme selector 206*e* may further select one encoded block from the third encoded block and the fourth encoded block. Alternatively stated, the scheme selector 206*e* may be configured to select one encoded block corresponding to each of the transformation types applied on the selected block 302*a*, based on the DPCM type (such as the DC-only DPCM and the all-frequency DPCM). For instance, the scheme selector 206*e* may determine that the second encoded block is of higher quality than the first encoded block, based on the DPCM type to which they correspond. In this scenario, the scheme selector 206*e* may select the second encoded block. The selected encoded blocks from the plurality of encoded blocks may be referred to as the set of encoded blocks. In accordance with an embodiment, the scheme selector 206e may not select the set of encoded blocks.

At operations 316A and 316B, the scheme selector 206e may be further configured to compute a bit-coverage value for each encoded block in the set of encoded blocks. In the event that the set of encoded blocks may not be selected, the scheme selector 206e may compute a bit-coverage value for each encoded block in the plurality of encoded blocks. The bit-coverage value may represent a count of bits encoded losslessly in each encoded block of the plurality of encoded blocks. For example, if out of "256 bits" of the block 302a, "123 bits" are encoded losslessly in an encoded block of the plurality of encoded blocks. The bit-coverage value for the encoded block is a value "123 bits". For the computation of the bit-coverage value (BCV) for each encoded block in the set of encoded blocks, the scheme selector 206e may utilize equation (1), as shown below:

$$\text{Bit Coverage Value(BCV)} = (D_0 + n \times D_1 - Q_n) \times N + R \quad (1)$$

where,

"BCV" represents the bit coverage value for a specific block;

"$D_0$" represents the first bit depth;

"n" represents a scaling parameter that is used to divide the quantized values to achieve higher compression ratios;

"$D_1$" represents an increased bit depth due to a specific transform;

"$Q_n$" represents an optimum quantization parameter utilized by the quantizer 206b, to quantize the plurality of transform coefficients of the corresponding transformed block;

"N" represents a count of transform coefficients in the plurality of transform coefficients in the corresponding transformed block; and "R" represents a count of refinement bits utilized to represent an encoded block in the set of encoded blocks. The count of refinement bits utilized to represent an encoded block may be determined from a bit budget associated with the corresponding encoded block.

The equation (1) facilitates the scheme selector 206e to compare any set of modes (e.g., a first mode for 1-D row DCT transform or a second mode of 1-D column DCT transform) without having to reconstruct a decoded block at the image compression section 206 of the encoder. The sampling parameters that is used to achieve a desired compression ratio for the input image, is "0.5", which is similar to a modified version of integer DCT used in High Efficiency Video Coding (HEVC)). In certain embodiments, the type of transform (e.g., 1-D row DCT or 1-D column DCT) that is implemented on a block of image, the scaling parameter ("n") may be accordingly computed to deal with the second bit depth that may otherwise vary based on the type of transform.

In certain embodiments, the bit coverage value (BCV) may be estimated without using any forward transform. In such implementations, the increased bit depth due to a specific transform ("$D_1$") may be equal to "0" and the equation (1) may get simplified to equation (2), as follows:

$$\text{Bit Coverage Value(BCV)} = (D_0 - Q_n) \times N + R \quad (2)$$

As described, although the bit coverage value (BCV) has been estimated after application of a specific transform scheme (e.g., 1D row DCT or 1D column DCT) followed by a specific quantization scheme on a particular block and a specific prediction scheme (e.g., DPCM). However, the scope of the present disclosure may not be so limited and the bit coverage value (BCV) may be estimated using any mode (different transform domain technique or sample domain techniques) that may or may not rely on a particular prediction scheme or a particular quantization scheme.

Although the disclosure describes the selection of an optimum encoding scheme using estimation of a bit coverage value for different possible modes of transform estimation. However, the disclosure may not be so limited and the selection of the optimum encoding scheme may be done based on estimation of minimum total sum of absolute difference (TSAD) from two or more TSAD's estimated after application of inverse quantization and followed by inverse transformation of an encoded block obtained from encoded bit-stream through different applicable modes for the encoding of a block of the input image. The mode (or the transform scheme) through which the TSAD obtained is minimum may be selected as the best or optimum encoding scheme for the encoding of the block of the input image.

With reference to FIG. 3B, there is shown a maximum bit-coverage value 318. There is further shown an operation 320 performed by the scheme selector 206e (FIG. 2) for the selection of an optimal sequential encoding scheme 322 for the generation of a compressed bit stream 324. There is further shown the digital image 302.

The scheme selector 206e may be further configured to detect one encoded block from the set of encoded blocks that has a maximum bit-coverage value 318. In the event that the set of encoded blocks may not be selected, the scheme selector 206e may detect one encoded block from the plurality of encoded blocks that has a maximum bit-coverage value 318. At operation 320, the scheme selector 206e may further select the sequential encoding scheme associated with the detected encoded block with the maximum bit-coverage value 318 value as the optimal sequential encoding scheme 322. For example, the scheme selector 206e identifies that the first encoded block has the maximum bit-coverage value 318. Thus, the scheme selector 206e may select the first sequential encoding scheme 304a associated with the first encoded block as the optimal sequential encoding scheme 322.

In accordance with an embodiment, the scheme selector 206e may be further configured to detect one encoded block from the set of encoded blocks that have a minimum bit-loss value. The bit-loss value may represent a count of bits from an uncompressed digital image that may be lost during generation of an encoded block from an uncompressed block by use of a sequential encoding scheme in the plurality of encoding scheme. The scheme selector 206e may be configured to determine the bit-loss value for each encoded block in the set of encoded blocks, based on the corresponding bit-coverage value. For example, a block may have "256 bits" before application of a sequential encoding scheme and the corresponding encoded block may have a bit-coverage value of "123 bits". In this scenario, the bit-loss may be computed as a difference of "256 bits" and "123 bits" (such as "133 bits"). Thus, the scheme selector 206e may compute the bit-loss value for each encoded block in the set of encoded blocks. Further, the scheme selector 206e may select the optimal sequential encoding scheme 322 associated with an encoded block that has a minimum bit-loss value.

After the selection of the optimal sequential encoding scheme 322, the image processor 202 may instruct the image compression section 206 to convert the selected block 302a of the digital image 302 to the compressed bit stream 324 storable in a reduced second storage space in the memory 204, by use of the selected sequential encoding scheme 322. In accordance with an embodiment, the selection of an optimal sequential encoding scheme along with the conversion may be performed independently for each block of the plurality of blocks of the digital image 302. Alternatively stated, estimation of bit-coverage value, selection of an optimal sequential encoding scheme, and conversion of each selected of the plurality of blocks may be performed independently. Thereafter, the image processor 202 may be configured to compress the received digital image to generate a compressed bit stream by use of a selected sequential encoding scheme for each block of the plurality of blocks. Thus, the compressed digital image may be efficiently and highly compressed that requires less storage space in comparison to the digital image 302.

In accordance with an embodiment, the image processor 202, in conjunction with the transceiver 210, may be further configured to transmit the compressed bit stream 324 to the display device 108. The decoder 108a in the display device 108 may decode the compressed bit stream 324 and remaining bit-streams corresponding to remaining blocks of the plurality of blocks to display the digital image 302. In accordance with an embodiment, the image processor 202 may instruct the I/O device 208 to display the digital image 302 on the display 208a. The digital image may be displayed as a result of a decompression of the compressed bit stream 324 and remaining bit-streams corresponding to remaining blocks of the plurality of blocks. The aforementioned decoding and/or decompression of the received compressed bit stream 324 may be performed by the decoder 108a, based on signaling, for example of the selected optimum quantization parameter and the optimal sequential encoding scheme 322, in the header bits of the compressed bit stream 324. Similarly, the decoding and/or decompression of the remaining bit-streams corresponding to remaining blocks of the plurality of blocks may be performed by the decoder 108a, based on the signaling, for example, of corresponding optimum quantization parameter and optimal sequential encoding scheme for the remaining blocks of the plurality of blocks.

The selection of an optimal sequential encoding scheme for conversion of a digital image to a compressed bit stream may provide an ability to apparatus, such as the image-processing apparatus 102, to store the digital image in a reduced storage space. The selection of the optimal sequential encoding scheme 322 by the image-processing apparatus 102 may be independent of the execution of one or more inverse processes, such as inverse transform or inverse quantization. Thus, the hardware complexity of the image-processing apparatus 102 is highly reduced in comparison to the conventional image-processing apparatuses. Further, the transmission of the generated compressed bit stream to render the digital image on a display device may require lesser transmission bandwidth.

Figure 4:
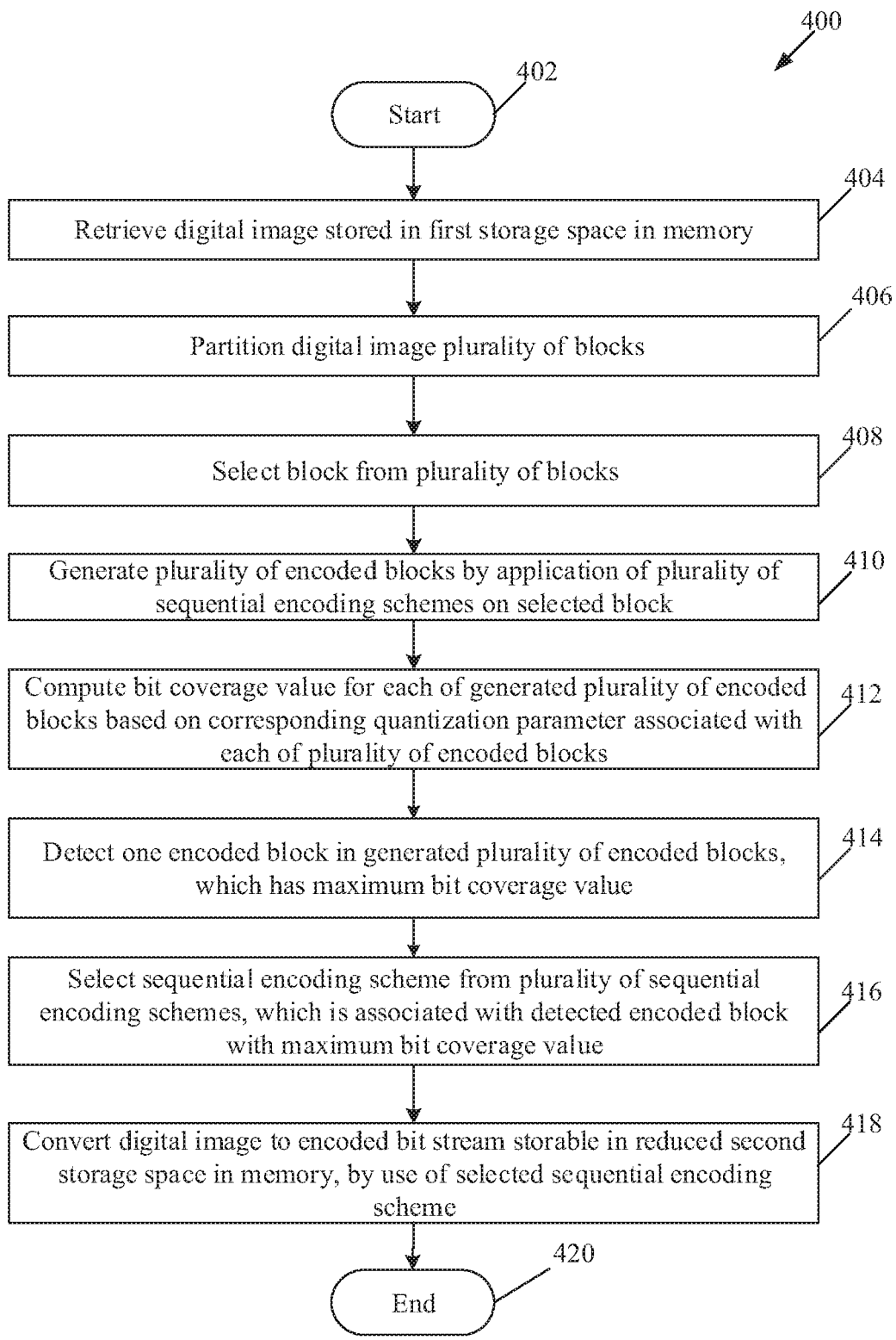
FIG. 4 is a flowchart that illustrates exemplary operations for compression of digital image data, in accordance with an embodiment of the disclosure.

FIG. 4 is a flowchart that illustrates exemplary operations for compression of digital image data, in accordance with an embodiment of the disclosure. With reference to FIG. 4, there is shown a flowchart 400. The flowchart 400 is described in conjunction with FIGS. 1, 2, 3A and 3B. The operations, implemented at the image-processing apparatus 102, begin at 402 and proceed to 404.

At 404, a digital image stored in a first storage space of the memory 204, may be retrieved. Alternatively, the image-processing apparatus 102 may receive the digital image from the server 104 or the image-capture device 106. The received digital image may comprise a plurality of pixels. An example of processing of the digital image 302 is shown and described in FIGS. 3A and 3B.

At 406, the digital image may be partitioned into a plurality of blocks by the image-processing apparatus 102. An example is shown and described in FIGS. 3A and 3B, where the image-processing apparatus 102 partitions the digital image 302 into the plurality of blocks, each similar to the block 302a. At 408, a block from the plurality of blocks may be selected by the image-processing apparatus 102. The image-processing apparatus 102 may select the block to apply a plurality of sequential encoding schemes. An example is shown and described in FIGS. 3A and 3B, where the image-processing apparatus 102 selects the block 302a from the plurality of blocks of the digital image 302.

At 410, a plurality of encoded blocks may be generated by the image-processing apparatus 102. The image-processing apparatus 102 may apply the plurality of sequential encoding schemes on the selected block for generation of the plurality of encoded blocks. Each of the plurality of encoded blocks may be associated with one sequential encoding scheme of the plurality of sequential encoding schemes. Further, each of the plurality of sequential encoding schemes may comprise a selection of a quantization parameter from a plurality of defined quantization parameters for generation of the plurality of encoded blocks. An example is shown and described in FIGS. 3A and 3B, where the image-processing apparatus 102 applies the plurality of sequential encoding schemes on the selected block 302a for generation of the plurality of encoded blocks. Examples of the plurality of sequential encoding schemes, such as the first sequential encoding scheme 304a, the second sequential encoding scheme 304b, the third sequential encoding scheme 304c, and the fourth sequential encoding scheme 304d, are also shown.

At 412, a bit-coverage value may be computed for each of the generated plurality of encoded blocks by the image-processing apparatus 102. The image-processing apparatus 102 may compute the bit-coverage value for each of the plurality of encoded blocks, based on a quantization parameter associated with each of the plurality of encoded blocks. The bit-coverage value may be indicative of a quality of the encoded block. The bit-coverage value may further represent a count of bits encoded losslessly in each encoded block of the generated plurality of encoded blocks. Further, each of the plurality of encoded blocks may be associated one bit-coverage value. An example is shown and described in FIGS. 3A and 3B, where the image-processing apparatus 102 computes the bit-coverage value for each of the plurality of encoded blocks by use of equation (1). An example of the computation of the bit-coverage value is explained at operations 316A and 316B. Although the disclosure describes the selection of an optimum encoding scheme using estimation of a bit coverage value for different possible modes of transform estimation. However, the disclosure may not be so limited and the selection of the optimum encoding scheme may be done based on estimation of minimum total sum of absolute difference (TSAD) from two or more TSAD's estimated after application of inverse quantization and followed by inverse transformation of an encoded block obtained from encoded bit-stream through different applicable modes for the encoding of a block of the input image. The mode (or the transform scheme) through which the TSAD obtained is minimum may be selected as the best or optimum encoding scheme for the encoding of the block of the input image.

At 414, one encoded block in the generated plurality of encoded blocks may be detected by the image-processing apparatus 102. The image-processing apparatus 102 may detect the encoded block in the generated plurality of encoded blocks, which has a maximum bit-coverage value. In accordance with an embodiment, the image-processing apparatus 102 may detect the encoded block in the generated plurality of encoded blocks, which may have a minimum bit-loss value among the plurality of encoded blocks. An example is shown and described in FIGS. 3A and 3B, where the image-processing apparatus 102 detects an encoded block that has the maximum bit-coverage value 318.

At 416, the sequential encoding scheme from the plurality of sequential encoding schemes may be selected by the image processing device 102. The selected sequential encoding scheme may be associated with the detected encoded block with the maximum bit-coverage value. The selected sequential encoding scheme may correspond to an optimal encoding scheme. The image-processing apparatus 102 may be configured to select the optimal sequential encoding scheme, independent of an execution of an inverse quantization and an inverse transform on the plurality of encoded blocks. An example is shown and described in FIGS. 3A and 3B, where the image-processing apparatus 102 selects the optimal sequential encoding scheme 322 from the plurality of sequential encoding schemes. In accordance with an embodiment, the optimal sequential encoding scheme 322 may be one of the first sequential encoding scheme 304a, the second sequential encoding scheme 304b, the third sequential encoding scheme 304c, or the fourth sequential encoding scheme 304d.

At 418, the selected block of the digital image may be converted to a compressed bit stream by the image-processing apparatus 102. The image-processing apparatus 102 may convert the selected block of the digital image to the compressed bit stream by use of the selected sequential encoding scheme. Further, the compressed bit stream may be stored as part of a compressed digital image in a reduced second storage space in the memory 204. In accordance with an embodiment, the image-processing apparatus 102 may transmit the compressed bit stream to the display device 108, for display to a plurality of users (not shown). An example is shown and described in FIGS. 3A and 3B, where the image-processing apparatus 102 converts the selected block 302a of the digital image 302 to the compressed bit stream 324, by use of the optimal sequential encoding scheme 322. The control may pass to the end 420.

In accordance with an embodiment of the disclosure, an apparatus for compression of digital image data is disclosed. The apparatus, such as the image-processing apparatus 102 (FIG. 1), may comprise a memory device (such as the memory 204) and may be configured to store a digital image (such as the digital image 302 (FIG. 3A)) in a first storage space. The image-processing apparatus 102 may further comprise one or more image processing circuits (such as the image processor 202 and the image compression section 206, which may comprise the transformation coder 206a, the quantizer 206b, the DPCM coder 206c, the entropy coder 206d, and the scheme selector 206e (FIG. 2)). The image processor 202 may be configured to select a block (such as the block 302a (FIG. 3A)) from a plurality of blocks of the digital image 302. The image compression section 206 may be configured to generate a plurality of encoded blocks by application of a plurality of sequential encoding schemes (such as the first sequential encoding scheme 304a, the second sequential encoding scheme 304b, the third sequential encoding scheme 304c, and the fourth sequential encoding scheme 304d (FIG. 3A)) on the selected block 302a. The scheme selector 206e may be configured to detect one encoded block in the generated plurality of encoded blocks that has a maximum bit-coverage (such as the maximum bit-coverage value 318 (FIG. 3B)) value among the plurality of encoded blocks. The scheme selector 206e may be further configured to select a sequential encoding scheme (such as the optimal sequential encoding scheme 322 (FIG. 3B)) from the plurality of sequential encoding schemes. The selected sequential encoding scheme 322 may be associated with the detected encoded block with the maximum bit-coverage value 318. Further, the selected sequential encoding scheme may correspond to an optimal sequential encoding scheme 322. The image processor 202, in conjunction with the image compression section 206, may be configured to convert the selected block 302a of the digital image 302 to a compressed bit stream (such as the compressed bit stream 324 (FIG. 3B)) by use of the selected sequential encoding scheme 322. Further, the compressed bit stream 324 may be storable in a reduced second storage space in the memory 204.

In conventional image compression techniques, an end-to-end compression and decompression may be performed on a block of a digital image to estimate the quality of the final decompressed block. Typically, in conventional image compression techniques, either a single coding technique is used, such as DCT or 2D DCT, or a plurality of coding techniques are used, such as DCT and entropy coding, DCT and quantization, quantization and entropy coding, in different permutation and combination of known coding techniques and standards, such as Joint Photographic Experts Group (JPEG) and High Efficiency Video Coding (HEVC). However, it is a challenge to decide which coding techniques to select and which sequence of different coding scheme should be applied to yield high compression with low hardware complexity. Further, as different images have different content or pixel values, a pre-decided encoding scheme may not be applicable or yield efficient results for different images.

The disclosed apparatus, such as the image-processing apparatus 102, comprises one or more image-processing circuits, such the image processor 202 and the image compression section 206. The image compression section 206 further comprises the transformation coder 206a, the quantizer 206b, the DPCM coder 206c, the entropy coder 206d, and the scheme selector 206e. The one or more image-processing circuits in the image-processing apparatus 102 automatically selects an optimal sequential encoding scheme from a plurality of sequential encoding schemes. The optimal sequential encoding scheme is determined in a simplified manner by detection of one encoded block in the generated plurality of encoded blocks that has a maximum bit-coverage (such as the maximum bit-coverage value 318 (FIG. 3B)) value among the plurality of encoded blocks. The operations executed by the image compression section 206 and the image processor 202 may provide high compression ability to the image-processing apparatus 102 with a low hardware complexity. Thus, an improved image-processing apparatus 102 and method are provided to efficiently compress digital data, such as the digital image 302, with visually lossless results. Further, the selection of the optimal sequential encoding scheme by the image-processing apparatus 102 is independent of the execution of the inverse processes, such as the inverse quantization and the inverse transform. Thus, the disclosed apparatus and method resolves the overhead costs of a complex hardware required for the selection of optimum encoding scheme in the conventional image compression techniques and apparatuses. Further, the disclosed apparatus and method bypasses the execution of the inverse processes during the selection of the optimal sequential encoding scheme. Thus, reducing the computational time required for image compression in comparison to the conventional image compression techniques and apparatuses.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for compression of digital image data. The at least one code section may cause the machine and/or computer to perform the steps that comprise storage, by one or more image processing circuits, of a digital image in a first storage space in a memory. A block from a plurality of blocks of the digital image may be selected by the one or more image processing circuits. A plurality of encoded blocks may be generated by the one or more image processing circuits, by application of a plurality of sequential encoding schemes on the selected block. One encoded block in the generated plurality of encoded blocks may be detected by the one or more image processing circuits. The detected one encoded block has a maximum bit-coverage value among the plurality of encoded blocks. A sequential encoding scheme from the plurality of sequential encoding schemes may be selected by the one or more image processing circuits. The selected sequential encoding scheme may correspond to an optimal sequential encoding scheme, which is associated with the detected encoded block with the maximum bit-coverage value. The selected block of the digital image may be converted to a compressed bit stream by the one or more image processing circuits. The selected block of the digital image may be converted to a compressed bit stream by use of the selected sequential encoding scheme. Further, the compressed bit stream may be storable in a reduced second storage space in the memory.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An apparatus for compression of digital image data, comprising:
   a memory configured to store a digital image in a first storage space; and
   one or more image processing circuits configured to:
   select a block from a plurality of blocks of said digital image;
   generate a first encoded block of a plurality of encoded blocks by application of a first sequential encoding scheme of a plurality of sequential encoding schemes on said selected block, wherein said first sequential encoding scheme comprises a sequential application of a one-dimensional (1D) row discrete cosine transform (DCT) followed by quantization, a direct current (DC) only discrete pulse code modulation (DPCM), and entropy coding;
   generate a second encoded block of said plurality of encoded blocks by application of a second sequential encoding scheme of said plurality of sequential encoding schemes on said selected block, wherein said second sequential encoding scheme comprises a sequential application of said 1D row DCT followed by said quantization, an all-frequency DPCM, and said entropy coding;
   execute inverse quantization and inverse transform on each encoded block of said plurality of encoded blocks;
   estimate a total sum of absolute difference (TSAD) for each encoded block of said plurality of encoded blocks after said execution of said inverse quantization and said inverse transform on each encoded block of said plurality of encoded blocks;
   detect one encoded block in said plurality of encoded blocks, wherein said detected one encoded block has a minimum TSAD among said TSAD for each of said plurality of encoded blocks;
   select a specific sequential encoding scheme from said plurality of sequential encoding schemes as an optimal sequential encoding scheme, wherein said selected specific sequential encoding scheme is associated with said detected one encoded block with said minimum TSAD; and
   convert said selected block of said digital image to a compressed bit stream storable in a reduced second storage space in said memory, wherein said selected block of said digital image is converted to said compressed bit stream based on said selected specific sequential encoding scheme.

2. The apparatus according to claim 1, wherein said one or more image processing circuits are further configured to partition said digital image into said plurality of blocks.

3. The apparatus according to claim 1, wherein each of said plurality of encoded blocks is associated with one sequential encoding scheme of said plurality of sequential encoding schemes.

4. The apparatus according to claim 1, wherein a third sequential encoding scheme of said plurality of sequential encoding schemes applied to said selected block, comprises a sequential application of a 1D column DCT followed by said quantization, said DC-only DPCM, and said entropy coding.

5. The apparatus according to claim 1, wherein a fourth sequential encoding scheme of said plurality of sequential encoding schemes applied to said selected block, comprises a sequential application of a 1D column DCT followed by said quantization, said all-frequency DPCM, and said entropy coding.

6. The apparatus according to claim 1, wherein
said one or more image processing circuits are further configured to compute a bit-coverage value for each encoded block of said plurality of encoded blocks based on a respective quantization parameter of a plurality of quantization parameters associated with each encoded block of said plurality of encoded blocks, and
said computed bit-coverage value represents a count of bits encoded losslessly in each encoded block of said plurality of encoded blocks.

7. The apparatus according to claim 6, wherein said plurality of quantization parameters is associated with said generation of said first encoded block and said second encoded block.

8. The apparatus according to claim 6, wherein said selection of said optimal sequential encoding scheme is based on said computed bit-coverage value for each encoded block of said plurality of encoded blocks.

9. The apparatus according to claim 1, wherein said selection of said optimal sequential encoding scheme along with said conversion of said selected block of said plurality of blocks of said digital image is performed independently for each block of said plurality of blocks of said digital image.

10. A method for compression of digital image data, comprising:
storing, by one or more image processing circuits, a digital image in a first storage space in a memory;
selecting, by said one or more image processing circuits, a block from a plurality of blocks of said digital image;
generating, by said one or more image processing circuits, a first encoded block of a plurality of encoded blocks by application of a first sequential encoding scheme of a plurality of sequential encoding schemes on said selected block, wherein said first sequential encoding scheme comprises a sequential application of a one-dimensional (1D) row discrete cosine transform (DCT) followed by quantization, a direct current (DC) only discrete pulse code modulation (DPCM), and entropy coding;
generating, by said one or more image processing circuits, a second encoded block of said plurality of encoded blocks by application of a second sequential encoding scheme of said plurality of sequential encoding schemes on said selected block, wherein said second sequential encoding scheme comprises a sequential application of said 1D row DCT followed by said quantization, an all-frequency DPCM, and said entropy coding;
executing, by said one or more image processing circuits, inverse quantization and inverse transform on each encoded block of said plurality of encoded blocks;
estimating, by said one or more image processing circuits, a total sum of absolute difference (TSAD) for each encoded block of said plurality of encoded blocks after said execution of said inverse quantization and said inverse transform on each encoded block of said plurality of encoded blocks;
detecting, by said one or more image processing circuits, one encoded block in said plurality of encoded blocks, wherein said detected one encoded block has a minimum TSAD among said TSAD for each of said plurality of encoded blocks;
selecting, by said one or more image processing circuits, a specific sequential encoding scheme from said plurality of sequential encoding schemes as an optimal sequential encoding scheme, wherein said selected specific sequential encoding scheme is associated with said detected one encoded block with said minimum TSAD; and
converting, by said one or more image processing circuits, said selected block of said digital image to a compressed bit stream storable in a reduced second storage space in said memory, wherein said selected block of said digital image is converted to said compressed bit stream based on said selected specific sequential encoding scheme.

11. The method according to claim 10, further comprising partitioning, by said one or more image processing circuits, said digital image into said plurality of blocks.

12. The method according to claim 10, wherein each of said plurality of encoded blocks is associated with one sequential encoding scheme in said plurality of sequential encoding schemes.

13. The method according to claim 10, wherein a third sequential encoding scheme of said plurality of sequential encoding schemes applied on said selected block, comprises a sequential application of a 1D column DCT followed by said quantization, said DC-only DPCM, and said entropy coding.

14. The method according to claim 10, wherein a fourth sequential encoding scheme of said plurality of sequential encoding schemes applied on said selected block, comprises a sequential application of a 1D column DCT followed by said quantization, said all-frequency DPCM, and said entropy coding.

* * * * *